United States Patent [19]

Groff

[11] Patent Number: 4,993,934
[45] Date of Patent: Feb. 19, 1991

[54] EXTRUDATE CUTTING APPARATUS FOR CONTROLLING THE FLOW OF EXTRUDATE FROM AN ORIFICE FITTING

[75] Inventor: E. Terry Groff, Reading, Pa.

[73] Assignee: Reading Pretzel Machinery Corp., Robesonia, Pa.

[21] Appl. No.: 374,497

[22] Filed: Jun. 30, 1989

[51] Int. Cl.⁵ .................. A21C 7/06; A21C 11/10; B29C 47/08
[52] U.S. Cl. ..................... 425/238; 83/199; 264/148; 425/295; 425/297; 425/305.1; 425/311
[58] Field of Search ............. 264/148; 425/311, 305.1, 425/296, 297, 289, 308, 238, 295; 83/199, 200, 604, 198, 197; 426/503, 512, 516, 517

[56] References Cited

U.S. PATENT DOCUMENTS

| | | |
|---|---|---|
| 526,274 | 9/1894 | Wallace ............................... 425/309 |
| 534,265 | 2/1895 | Hogg ................................... 83/199 |
| 1,268,003 | 5/1918 | Granlund ........................... 425/208 |
| 2,256,617 | 9/1941 | Kipnis ................................ 425/310 |
| 2,429,042 | 10/1947 | Bader ................................ 426/503 |
| 2,493,854 | 1/1950 | Brainard ........................... 426/503 |
| 2,742,000 | 4/1956 | Hansen et al. ..................... 425/375 |
| 3,262,470 | 7/1966 | Alcaro ............................... 141/129 |
| 3,407,440 | 10/1968 | Myers, Jr. .......................... 425/319 |
| 3,494,233 | 2/1970 | Kojima ............................... 83/199 |
| 3,494,304 | 2/1970 | Gugler ............................... 264/339 |
| 3,632,463 | 1/1972 | McFarlane ......................... 425/113 |
| 3,737,269 | 6/1973 | Grady ................................ 425/196 |
| 3,940,226 | 2/1976 | Verhoeven ......................... 425/375 |
| 4,332,538 | 6/1982 | Campbell ........................... 425/140 |
| 4,389,357 | 6/1983 | Chu et al. .......................... 264/40.1 |
| 4,478,569 | 10/1984 | Giulio et al. ...................... 425/324.1 |
| 4,479,768 | 10/1984 | Kube et al. ........................ 425/311 |
| 4,536,147 | 8/1985 | Groff ................................. 425/323 |
| 4,592,715 | 6/1986 | Nebelung ........................... 425/308 |
| 4,619,164 | 10/1986 | Aikens ............................... 83/200 |
| 4,648,828 | 3/1987 | Abe et al. .......................... 425/288 |
| 4,676,727 | 6/1987 | Atwood ............................. 264/140 |
| 4,737,092 | 4/1988 | Bullick .............................. 425/311 |

FOREIGN PATENT DOCUMENTS

| | | | |
|---|---|---|---|
| 194863 | 9/1986 | European Pat. Off. ............ | 425/516 |
| 58-209876 | 12/1983 | Japan ................................... | 83/200 |

Primary Examiner—Jay H. Woo
Assistant Examiner—K. P. Nguyen
Attorney, Agent, or Firm—Panitch, Schwarze, Jacobs & Nadel

[57] ABSTRACT

An extrudate cutting apparatus including a generally cylindrically shaped shaping die having an upper surface and a lower surface with an eccentrically positioned opening extending therebetween. The opening releasably receives an orifice fitting for permitting extrudate to pass from the fitting through the opening. A generally tubular housing rotatably receives the shaping die therein. A nozzle knife is integral with the housing and is in facing relation with the lower shaping die surface. The knife includes an aperture for allowing extrudate passing from the orifice fitting to pass therethrough unimpeded when the aperture and the shaping die opening are in registry. A reciprocating bar is provided for imparting rotational movement to the tubular housing for moving the housing between an open position wherein the shaping die opening and the aperture are in registry and a closed position wherein the shaping die opening and the aperture are completely out of registry to prevent any of the extrudate from passing through the aperture. In this manner, the aperture severs the extrudate passing through the opening as the housing moves from the open to the closed position.

15 Claims, 3 Drawing Sheets

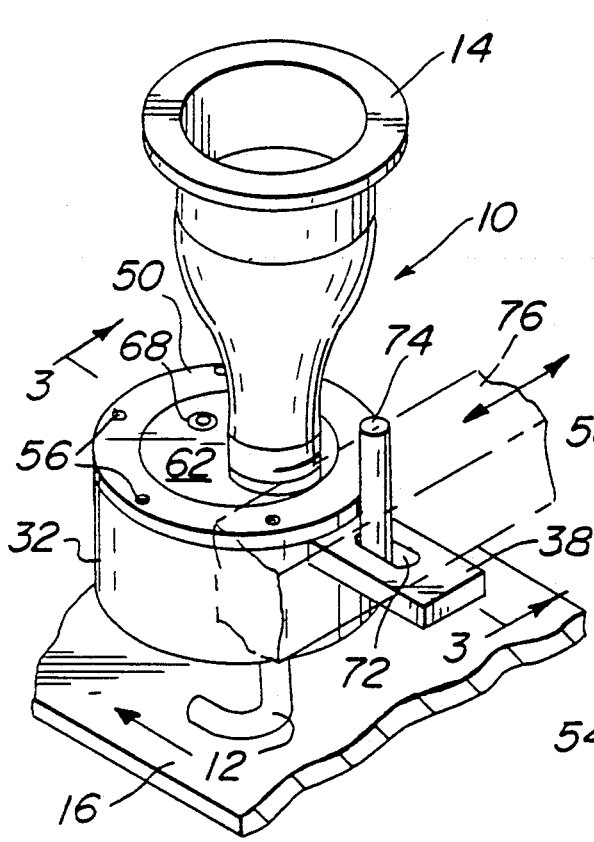
FIG. 1
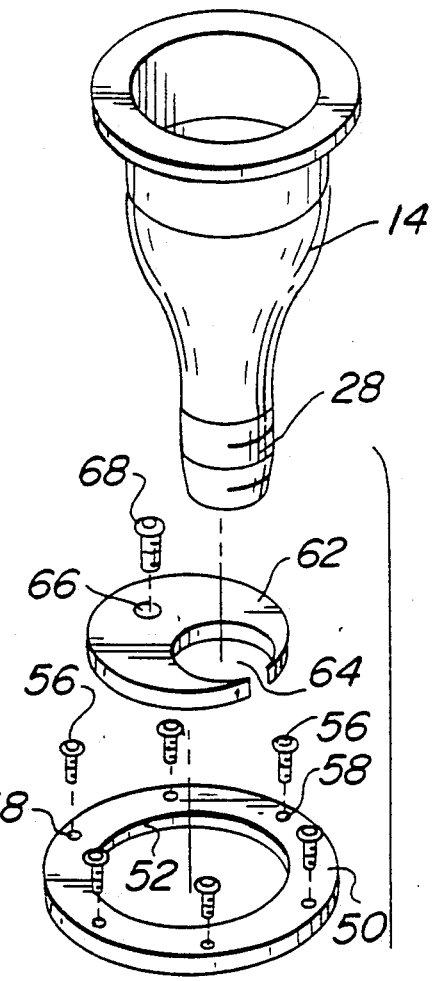
FIG. 2
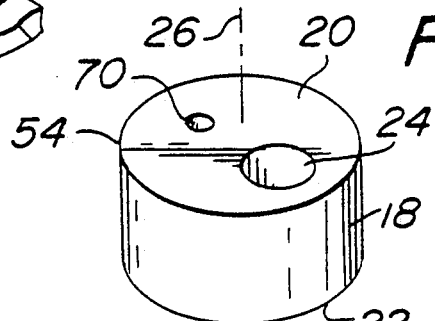
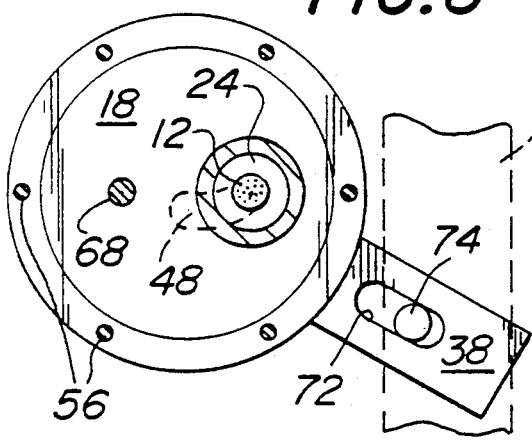
FIG. 8
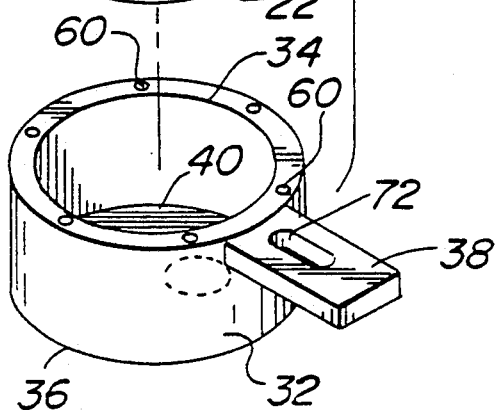

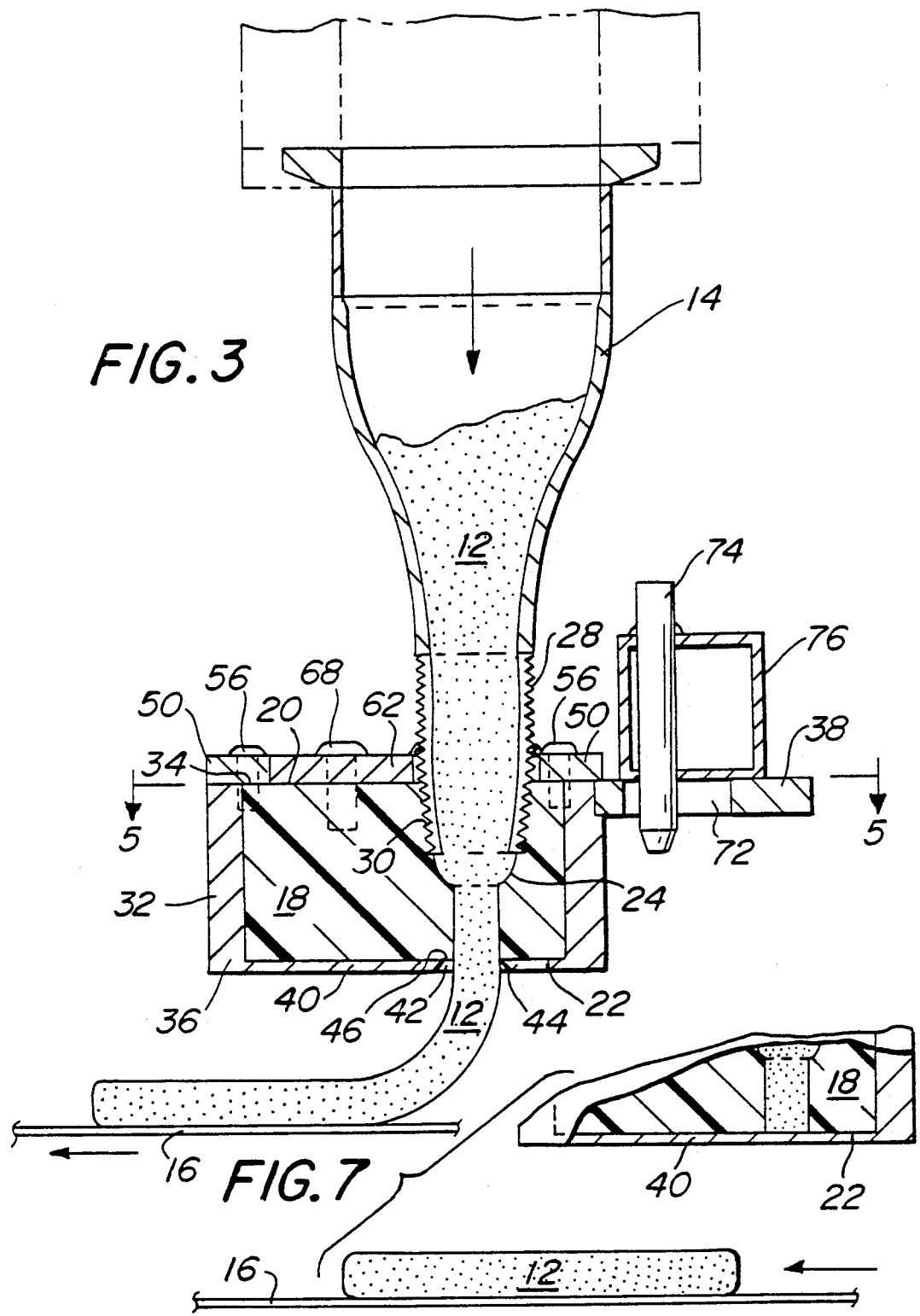

EXTRUDATE CUTTING APPARATUS FOR CONTROLLING THE FLOW OF EXTRUDATE FROM AN ORIFICE FITTING

FIELD OF THE INVENTION

The present invention relates to an extrudate cutting apparatus and, more particularly to an extrudate cutting apparatus for controlling the flow of a viscous material such as pretzel dough from an orifice fitting.

BACKGROUND OF THE INVENTION

In the pretzel making field, pretzel dough is extruded in the shape of a pretzel and then severed. Consequently, in the pretzel dough extruding field, there exists a need for a simple and accurate way of apportioning and extruding dough. In addition, there exists a need for an extrudate cutting apparatus which can cleanly sever extruded pretzel dough at high speeds and without distorting the dough from the configuration imparted to it by the orifice fitting.

When flowable, viscous material or dough is to be divided and dispensed from a large mass of material into smaller measured volumes of material or dough, it has been common practice to urge the dough from a supply of dough through a conduit system to the area where it is to be subdivided and dispensed. By repeatedly opening and closing a cutting apparatus, the material moving through the conduit system can be divided from the on-coming material and dispensed to an awaiting container, conveyor, etc.

Conventionally, there exist two processes for apportioning and extruding dough. One process requires dough strips to be extruded in continuous strands and cut to length on a transport conveyor by a different piece of machinery. The problem with this process is that the major diameter of the product is limited by the fixed size of the orifice and the length of the material is limited by the cutting system, which is designed to provide a uniform and fixed length of product.

The second process entails the use of a complicated cutting system which severs the dough at the face plate of the extrusion nozzle. A pretzel die fixes the major shape and appearance of the pretzel. By varying the cutting rate and extrudance speed, pretzels of this defined shape can be a bit lighter or heavier in weight, but the appearance remains the same. The above processes are problematic in that they require a continuous flow of dough through either a dye or an orifice.

The present invention overcomes many of the disadvantages inherent in the above-described extrudate systems by providing an efficient and accurate way of cleanly severing the extrudated pretzel dough or other viscous material, while at the same time stopping the flow of the pretzel dough or material. Moreover, the present invention can temporarily stop the flow of dough while other machine operations could occur that might alter the final shape of the product. In addition, the extrudate cutting apparatus of the present invention includes a variable orifice for allowing the major diameter of the extrudate stream to be varied, to thereby give the dough piece the appearance of being handmade.

The extrudate cutting apparatus of the present invention, for example, can extrude dough onto a computer-controlled table which moves in two dimensions to produce a pretzel or other decorative shape. By changing the program of the two-dimensional table, the shape of the product can be changed. By temporarily interrupting the extrusion process, the two-dimensional table can yield a limitless variety of shapes and decorative patterns.

SUMMARY OF THE INVENTION

Briefly stated, the present invention comprises an extrudate cutting apparatus for controlling the flow of extrudate from an orifice fitting. The extrudate cutting apparatus comprises a generally cylindrically shaped shaping die having an upper surface and a lower surface. The shaping die includes an eccentrically positioned opening extending from the upper surface to the lower surface for releasably receiving the orifice fitting and permitting the extrudate to pass from the fitting through the opening. The cutting apparatus further includes a generally tubular housing which rotatably receives the shaping die therein. The housing has a first open end positioned proximate the upper shaping die surface and a second end positioned proximate the lower shaping die surface. Integral with the second end, and in facing relation with the lower shaping die surface, is a nozzle knife for retaining the shaping die within the housing. The knife includes an aperture for allowing extrudate from the orifice fitting to pass therethrough unimpeded when the aperture and the opening are in registry. Actuator means are provided for rotating the housing with respect to the shaping die and for moving the housing between an open position wherein the opening and the aperture are in registry to allow the extrudate to pass therethrough unimpeded, and a closed position wherein the opening and the aperture are completely out of registry to prevent any of the extrudate from passing through the aperture. The nozzle knife aperture is generally circularly shaped and sized to complement the opening in the lower surface of the shaping die. In alternative embodiments, the aperture in the nozzle knife can be generally kidney shaped for metering the cross-sectional shape of the extrudate passing therethrough or can be generally frusto-conically shaped to provide a beveled slicing surface.

BRIEF DESCRIPTION OF THE DRAWINGS

The foregoing summary, as well as the following detailed description of preferred embodiments, will be better understood when read in conjunction with the appended drawings. For the purpose of illustrating the invention, there is shown in the drawings embodiments which are presently preferred, it being understood, however, that the invention is not limited to the specific methods and instrumentalities disclosed. In the drawings:

FIG. 1 is a perspective view of an extrudate cutting apparatus in accordance with the present invention;

FIG. 2 is an exploded perspective view of the extrudate cutting apparatus of FIG. 1;

FIG. 3 is a greatly enlarged partial sectional view of the extrudate cutting apparatus of FIG. 1, taken along line 3—3 of FIG. 1;

FIG. 7 is a partial sectional view of the extrudate cutting apparatus of FIG. 6, taken along line 7—7 of FIG. 6; and FIG. 8 is a reduced size sectional view of the extrudate cutting apparatus of FIG. 1 in accordance with an alternate embodiment of the present invention.

DESCRIPTION OF THE PREFERRED EMBODIMENTS

Figure 4:
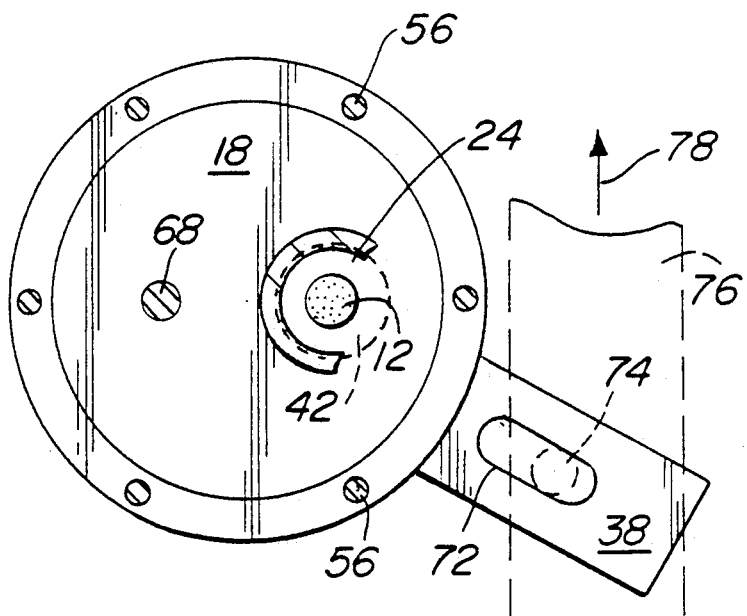
FIG. 4 is a partial sectional view of the extrudate cutting apparatus in an open position, taken along line 5—5 of FIG. 3.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the extrudate cutting apparatus and designated parts thereof. The terminology includes the words above specifically mentioned, derivatives thereof and words of similar import.

Referring to the drawings in detail, wherein like numerals indicate like elements throughout, there is shown in FIGS. 1 through 7 a first preferred embodiment of an extrudate cutting apparatus in accordance with the present invention. FIG. 1 is a perspective view of an extrudate cutting apparatus, generally designated 10, in accordance with the present invention. Generally, extrudate cutting apparatus 10 controls the flow of material 12 (hereinafter "extrudate") from a generally streamlined orifice fitting 14 to a conveyor belt 16. In the present embodiment, it is preferred that the material to be extruded is pretzel dough. However, it is understood by those skilled in the art that the present invention is applicable to any other viscous material, such as caulk.

The extrudate cutting apparatus 10 is generally used in conjunction with a food processing apparatus having an extrudate outlet nozzle for discharging extrudate in a preselected configuration on a receiver or conveyor belt. Either the outlet nozzle is moved with respect to the conveyor belt or vice versa in order to form the desired configuration. Such a food processing apparatus for producing pretzels is disclosed in U.S. Pat. No. 4,536,147, which is hereby incorporated by reference.

Referring now to FIGS. 2 and 3, the cutting apparatus 10 includes a shaping die 18 which in the present embodiment is generally cylindrically shaped and includes a generally planar upper surface 20 and a generally planar lower surface 22. The shaping die 18 also includes an opening 24 extending from the upper surface 20 to the lower surface 22. For reasons which will hereinafter become apparent, the opening 24 is eccentrically positioned at a predetermined radial distance from the longitudinal axis 26 of shaping die 18.

In the presently preferred embodiment, the opening 24 in lower surface 22 is generally circular in cross-section to thereby define the configuration imparted to the extrudate 12 after passing therethrough. It is understood by those skilled in the art that the opening 24 in lower surface 22 can be of different geometric shapes for changing the configuration of the extrudate. For instance, the opening 24 can be generally oval star-shaped, or elliptical in cross section without departing from the spirit and scope of the invention.

In the present embodiment, it is preferred that the shaping die 18 be constructed of a generally rigid easily cleanable material such as steel or a polymeric material. However, it is understood by those skilled in the art that shaping die 18 could be constructed of any other high strength, lightweight material.

Shaping die 18 is operatively associated with the orifice fitting 14 so that the extrudate 12 passes from orifice fitting 14 through the shaping die opening 24. The portion of the shaping die opening 24 proximate the upper surface 20 is suitably sized and configured to receive the lower end of the orifice fitting 14 as shown in FIG. 3. More particularly, preferably the orifice fitting 14 is releasably fixed to or received within opening 24 at the upper surface 20 of shaping die 18, thereby allowing the extrudate 12 to directly pass from the orifice fitting 14 through the shaping die opening 24. By providing a shaping die 18 which is readily and/or releasably removable from the orifice fitting 14, a shaping die having a different geometrically shaped opening 24 can be readily substituted when a change to the extrudate configuration is necessary or desired.

Referring now to FIG. 3, in the presently preferred embodiment, the orifice fitting 14 includes a threaded first end 28. Similarly, the upper portion of opening 24 of the shaping die 18 includes internal threads 30 extending downwardly from upper surface 20 for threadably receiving first end 28 of orifice fitting 14. It is understood by those skilled in the art that the orifice fitting 14 can be releasably fixed to the opening 24 by other instrumentalities, such as a snap ring assembly (not shown), without departing from the spirit and scope of the invention. Similarly, it is also understood by the ordinarily skilled artisan that orifice fitting 14 can be permanently fixed to opening 24 if it is not necessary to change the configuration of the extrudate.

As shown in FIGS. 2 and 3, a generally tubular housing 32 rotatably receives and surrounds the shaping die 18 such that the housing 32 can rotate relative to shaping die 18. Preferably, the housing 32 is axially aligned with the shaping die 18. Tubular housing 32 is generally annular in cross section and includes a first open end 34 positioned proximate the upper shaping die surface 20 and a second end 36 positioned proximate the lower shaping die surface 22 (see FIG. 3). In the present embodiment, it is preferred that tubular housing 32 be constructed of a high strength, lightweight easily cleanable material, such as steel or stainless steel. However, it is apparent to those skilled in the art that the tubular housing 32 can be constructed of some other suitable material such as by an injection mold process using a high strength, lightweight plastic or polymeric material, such as polyethylene.

For convenience and ease of description only, the remaining components of extrudate cutting apparatus 10 described hereinafter, are preferably constructed of a high strength, lightweight material, such as steel or stainless steel, except as noted. However, it is understood by those skilled in the art that the various components can be constructed of other materials. For example, the non-load bearing components could be constructed of a polymeric material.

As shown in FIG. 3, a nozzle knife 40 is positioned subjacent the shaping die 18 in facing relation with the lower surface 22 and is rotatably mounted with respect thereto. The nozzle knife 40 is preferably integral with the second end 36 of tubular housing 32 for retaining the shaping die 18 within the tubular housing 32. The nozzle knife 40 includes an aperture 42 eccentrically positioned thereon at the same predetermined radial distance from longitudinal axis 26 as opening 24 of the shaping die 18. Specifically, the aperture 42 and opening 24 are eccentrically positioned such that the aperture 42 and opening 24 can be positioned in registry. When the aperture 42 and opening 24 are in registry as shown in FIG. 3, extrudate 12 can pass therethrough. In the presently preferred embodiment, the aperture 42 is generally circularly shaped and is sized to complement the opening 24 in the lower surface 22 of the shaping die 18. However, it is understood by those skilled in the art, that the geometric configuration of the aperture 42 may be changed to complement different geometric configurations of the opening 24 to thereby produce different configurations of extrudate, such as oval or elliptical (not shown).

In the presently preferred embodiment, the aperture 42 is generally frusto-conically shaped (see FIG. 3). The generally frusto-conically shaped aperture 42 preferably includes a generally circular base 44 and a generally circular top surface 46. The diameter of the top surface 46 is smaller than the diameter of the base 44 to thereby provide a beveled cutting surface. The top surface 46 is in facing relationship with the lower surface 22 of the shaping die 18 and is sized to complement opening 24. This allows the extrudate to be sharply severed, as described hereinafter. However, it is understood by those skilled in the art, that the nozzle knife 40 can be constructed of a sufficiently small thickness to accomplish the same result, without having to frusto-conically shape the aperture.

In an alternate embodiment illustrated in FIG. 8, the nozzle knife 40 includes a generally tapered kidney shaped aperture 48 for metering the cross-sectional shape of extrudate 12 passing through the opening 24, as described hereinafter. Preferably, one end 48a of the kidney shaped aperture 48 is sized to complement the opening 24 and a second end 48b is sized smaller than the opening 24 for reducing the cross-sectional area of the extrudate 12 passing therethrough.

As shown in FIGS. 1 and 2, a generally annular retaining member 50 is releasably secured to the first open end 34 of the tubular housing 32 to permit tubular housing 32 to rotate with respect to the shaping die 18. Retaining member 50 has an inner diameter 52 which is less than the outer diameter 54 of the shaping die 18 for retaining the shaping die 18 within the tubular housing 32. More particularly, the retaining member 50 is preferably releasably secured to the tubular housing 32 by a plurality of threaded screws 56 which are equidistantly spaced around the annular retaining member 50 within suitably sized holes 58 therein, as shown in FIG. 2. Preferably the screws 56 are threadably secured to the tubular housing 32 within threaded mounting holes 60 also equidistantly spaced about the tubular housing 32 at its first end 34, as is apparent to those skilled in the art. It is also understood by those skilled in the art that the retaining member 50 can be secured to tubular housing 32 by other means, such as buckle clamps mounted on the side of tubular housing 32.

As previously stated, the orifice fitting 14 is preferably threadably secured to the shaping die opening 24. Consequently, the extrudate cutting apparatus 10 further includes securing means for rotatably securing the shaping die 18 to the orifice fitting 14. In the presently preferred embodiment, the securing means includes a generally disk-like torque plate 62 positioned within the annular retaining member 50 and sized to complement the inner diameter 52 of the retaining member 50, as shown in FIGS. 1 and 3. More particularly, the torque plate 62 includes a first opening 64 eccentrically positioned with respect to longitudinal axis 26, but coaxially positioned along the same axis as the orifice fitting 14. The first opening 64 is sized slightly larger than the first threaded end 28 of orifice fitting 14 for allowing orifice fitting 14 to be positioned therethrough.

The torque plate 62 includes a second opening 66 also eccentrically positioned with respect to longitudinal axis 26 and suitably sized to rotatably receive a threaded screw 68. The shaping die 18 further includes a threaded hole 70 for threadably receiving screw 68 to thereby rotatably secure the shaping die 18 to the orifice fitting 14. Due to the eccentric positioning of the first and second openings 64 and 66 with respect to longitudinal axis 26, when the torque plate 62 is positioned within the retaining member 50 as shown in FIG. 1, shaping die 18 cannot rotate with respect to the orifice fitting 14, thereby securing the shaping die 18 to the orifice fitting 14, as is understood by those skilled in the art.

It is understood by those skilled in the art, that the orifice fitting 14 can be secured to the shaping die 18 through other means. For instance, a key (not shown) could be used to rotatably secure the orifice fitting 14 to the shaping die 18 and a snap ring (not shown) can be used to axially secure the orifice fitting 14 within the shaping die opening 24.

Referring now to FIGS. 4 through 7, the extrudate cutting apparatus 10 further includes actuator means for rotating the tubular housing 32 with respect to the shaping die 18 whereby the actuator means moves the tubular housing 32 between an open position (FIG. 4) wherein the opening 24 and aperture 42 are in registry and extrudate 12 can pass therethrough unimpeded, and a closed position (FIGS. 6 and 7) wherein the opening 24 and aperture 42 are completely out of registry for preventing extrudate 12 from passing through the aperture 42. In the presently preferred embodiment, the actuator means includes a connecting arm 38 which is fixed to and extends generally radially from tubular housing 32. The connecting arm 38 further includes a generally radially extending generally oval slot 72. A generally cylindrical pin 74 is mounted for reciprocal motion with respect to tubular housing 32. The slot 72 slidably receives pin 74 such that reciprocal motion by the pin 74 imparts rotational movement to tubular housing 32 for moving tubular housing 32 between the open (FIG. 4) and closed (FIG. 6) positions.

In the presently preferred embodiment, the pin 74 is integrally mounted on a reciprocating bar 76 (shown in phantom) for imparting rotational movement to tubular housing 32. However, it is appreciated by those skilled in the art that other means may be used for moving tubular housing 32 between the open and closed positions. For instance, tubular housing 32 could include a plurality of teeth for drivingly receiving an actuator gear for rotating tubular housing 32 (not shown).

Figure 5:
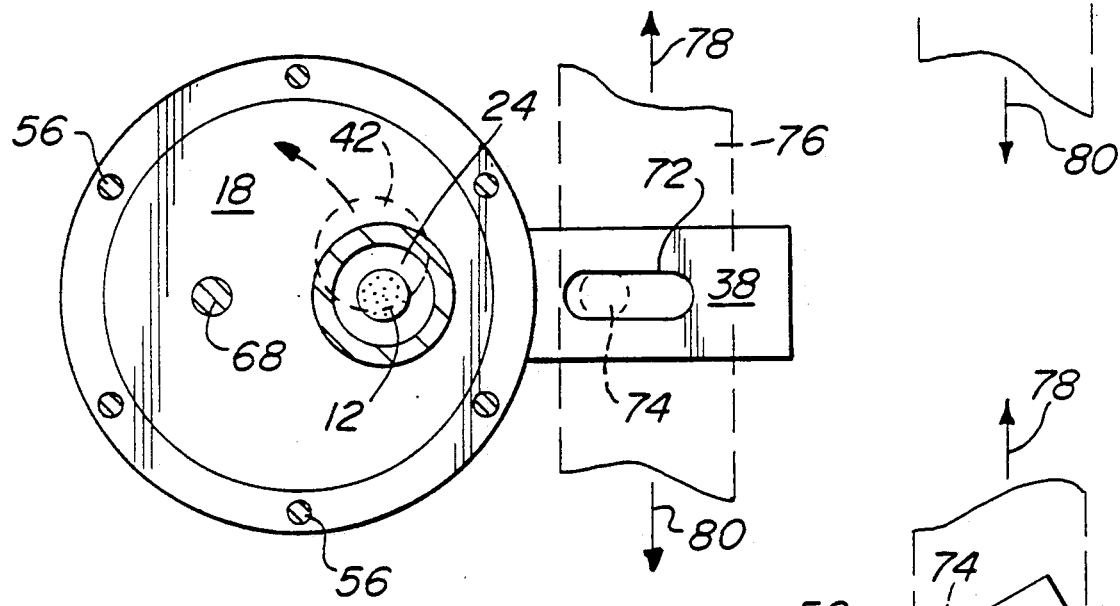
FIG. 5 is a partial sectional view of the extrudate cutting apparatus in an intermediate position, taken along line 5—5 of FIG. 3.
Figure 6:
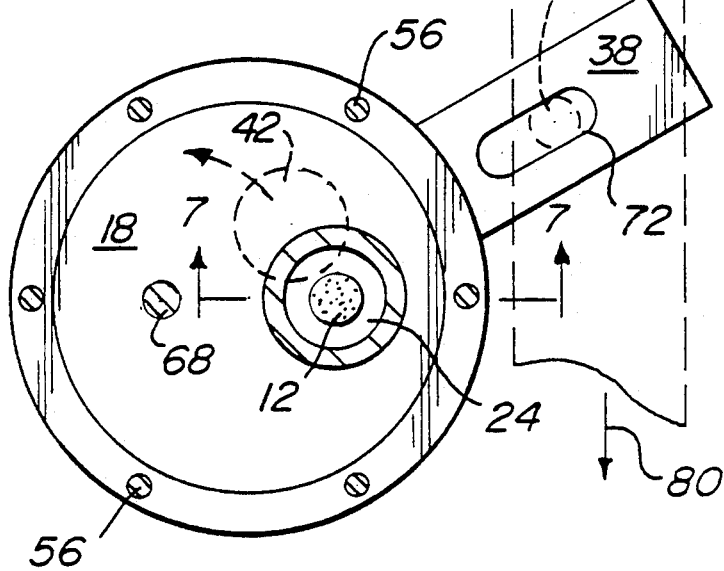
FIG. 6 is a partial sectional view of the extrudate cutting apparatus in a closed position, taken along line 5—5 of FIG. 3.

In operation, extrudate cutting apparatus 10 is assembled as shown in FIG. 1. In the preferred embodiment, dough 12 is urged through the streamlined orifice fitting 14, out the first end 28 and through the opening 24 (see FIG. 3). When tubular housing 32 is positioned such that the opening 24 and aperture 42 are in registry (FIG. 4), dough 12 is extrudated through the aperture 42 at a predetermined speed. In order to stop the flow of extrudate passing through the aperture 42, the bar 76 is reciprocated in a first direction (as shown by the arrow 78 in FIG. 4) to thereby impart rotational motion (counter clockwise when viewing FIG. 4) to tubular housing 32, as is apparent to those skilled in the art. As shown in FIG. 5, as bar 76 initially begins to reciprocate, the aperture 42 and opening 24 assume an intermediate position wherein the aperture 42 partially overlaps the opening 24 to thereby begin decreasing the flow of extrudate therethrough. As bar 76 continues to reciprocate in the first direction 78, the aperture 42 and opening 24 are no longer in registry to thereby place the extrudate cutting apparatus 10 in a closed position, as shown in FIGS. 6 and 7. At this point the flow of extrudate 12 is cleanly severed or cut off, since the bar 76 is reciprocated at a speed sufficient to accomplish this end. To place the extrudate cutting apparatus 10 in the open position for allowing extrudate 12 to pass through opening 24 and aperture 42, bar 76 is reciprocated in a second direction as indicated by the arrow 80 in FIG. 4.

Concerning the operation of the alternate embodiment disclosed in FIG. 8, as previously stated, the nozzle knife 40 includes a generally tapered kidney shaped aperture 48 for metering the cross-sectional shape of extrudate 12 passing through the opening 24. The opening and closing of the extrudate cutting apparatus 10 depicted in FIG. 8 is generally similar to the operational characteristics of the embodiment discussed above. By moving the nozzle knife 40 from the open to the closed position, the configuration or cross-sectional shape of the extrudate passing through opening 24 is reduced as compared to the open position, due to the generally kidney shaped aperture. Hence, the cross-sectional configuration of the extrudate can be varied without having to change the shaping die.

From the foregoing description, it can be seen that the present invention comprises an extrudate cutting apparatus which cleanly severs the extruded dough without distortion of the dough from the configuration imparted to it by the shaping die. It will be recognized by those skilled in the art that changes may be made to the above-described embodiments of the invention without departing from the broad inventive concept thereof. It is understood, therefore, that this invention is not limited to the particular embodiments disclosed, but is intended to cover all modifications which are within the scope and sphere of the invention as defined by the appended claims.

I claim:

1. An extrudate cutting apparatus for controlling the flow of extrudate from an orifice fitting, said apparatus, comprising:
   a generally cylindrically shaped shaping die have an upper surface and a lower surface, said shaping die including an eccentrically positioned opening extending from said upper surface to said lower surface for releasably receiving said orifice fitting and permitting said extrudate to pass from said fitting through said opening;
   a generally tubular housing rotatably receiving said shaping die therein, said housing having a first open end positioned proximate said upper shaping die surface and a second end positioned proximate said lower shaping die surface;
   a nozzle knife integral with said second housing end and in facing relation with said lower shaping die surface for retaining said shaping die within said housing, said knife including an aperture for allowing extrudate from said orifice fitting to pass therethrough unimpeded when said aperture and said opening are in registry; and
   actuator means for rotating said housing with respect to said shaping die and for moving said housing between an open position wherein said opening and said aperture are in registry to allow said extrudate to pass therethrough unimpeded, and a closed position wherein said opening and said aperture are completely out of registry to prevent any of said extrudate from passing through said aperture.

2. The extrudate cutting apparatus as recited in claim 1 wherein said actuator means includes a connecting arm fixed to and extending generally radially from said housing, said arm further including a generally radially extending slot and a pin mounted for reciprocal motion with respect to said housing, said slot slidably receiving said pin such that reciprocal motion by said pin imparts rotational movement to said housing for moving said housing between said open and closed positions.

3. The extrudate cutting apparatus as recited in claim 1 further including a retaining member fixed to said first end for retaining said shaping die within said housing.

4. The extrudate cutting apparatus as recited in claim 1 wherein said shaping die is constructed of plastic and said tubular housing and nozzle knife are constructed of a metal.

5. The extrudate cutting apparatus as recited in claim 1 wherein said aperture in said nozzle knife is generally circularly shaped and sized to complement said opening in said lower surface of said shaping die.

6. The extrudate cutting apparatus as recited in claim 1 wherein said aperture in said nozzle knife is generally kidney shaped for metering the cross-sectional shape of the extrudate passing through said opening by positioning said nozzle knife in an intermediate position between said open and closed positions.

7. The extrudate cutting apparatus as recited in claim 1 wherein said aperture in said nozzle is generally frusto-conically shaped, said frusto-conically shaped aperture having a base and a top surface, said top surface being in facing relationship with the lower surface of said shaping die and sized to complement said opening therein.

8. An extrudate cutting apparatus for controlling the flow of extrudate from a streamlined orifice fitting to a conveyor belt, said apparatus comprising:
   a generally cylindrically shaped shaping die having an upper surface and a lower surface, said shaping die including an opening extending from said upper surface to said lower surface, said opening being eccentrically positioned at a predetermined radial distance from the longitudinal axis of said die, said orifice fitting being releasably fixed to said opening at said upper surface of said shaping die so that said extrudate passes from said orifice fitting through said shaping die opening;
   a generally tubular housing rotatably receiving and surrounding said shaping die such that said housing can rotate relative to said shaping die, said housing being axially aligned with said die, said tubular housing having a first open end positioned proximate said upper shaping die surface and a second end positioned proximate said lower shaping die surface;
   a nozzle knife integral with said second end off said housing, said knife including an aperture eccentrically positioned at said predetermined radial distance such that when said aperture and said opening are in registry said extrudate can pass therethrough;

a generally annular retaining member releasably secured to said first end of said housing, said retaining member having an inner diameter which is less than the outer diameter of said shaping die for retaining said shaping die within said housing; and actuator means for rotating said housing with respect to said shaping die whereby said actuator means moves said housing between an open position where said opening and said aperture are in registry and said extrudate can pass therethrough unimpeded, and a closed position wherein said opening and said aperture are completely out of registry such that any of said extrudate cannot pass through said aperture.

9. The extrudate cutting apparatus as recited in claim 8 wherein said actuator means includes a connecting arm fixed to and extending generally radially from said housing, said arm further including a generally radially extending slot, and a pin mounted for reciprocal motion with respect to said housing, said slot slidably receiving said pin such that reciprocal motion by said pin imparts rotational movement to said housing for opening and closing said cutting apparatus.

10. The extrudate cutting apparatus as recited in claim 8 wherein said orifice fitting is threadably secured to said opening and said cutting apparatus further includes securing means for rotatably securing said die to said orifice fitting.

11. The extrudate cutting apparatus as recited in claim 10 wherein said securing means includes a generally disk-like torque plate positioned within said annular retaining member and sized to complement the inner diameter of said retaining member.

12. The extrudate cutting apparatus as recited in claim 8 wherein said shaping die is constructed of plastic and said tubular housing and nozzle knife are constructed of a metal.

13. The extrudate cutting apparatus as recited in claim 8 wherein said aperture in said nozzle knife is generally circularly shaped and sized to complement said opening in said lower surface of said shaping die.

14. The extrudate cutting apparatus as recited in claim 8 wherein said aperture in said nozzle knife is generally kidney shaped for metering the cross-sectional shape of the extrudate passing through said opening by positioning said nozzle knife in an intermediate position between said open and closed positions.

15. The extrudate cutting apparatus as recited in claim 8 wherein said aperture in said nozzle is generally frusto-conically shaped, said frusto-conically shaped aperture having a base and a top surface, said top surface being in facing relationship with the lower surface of said shaping die and sized to complement said opening therein.

* * * * *